US006552140B1

United States Patent
Kneafsey et al.

(10) Patent No.: US 6,552,140 B1
(45) Date of Patent: Apr. 22, 2003

(54) AUTO-OXIDATION SYSTEMS FOR AIR-ACTIVATABLE POLYMERISABLE COMPOSITIONS

(75) Inventors: Brendan J. Kneafsey, Lucan (IE); Rory B. Barnes, Dublin (IE)

(73) Assignee: Loctite (R&D) Limited, Dublin (IE)

( * ) Notice: Subject to any disclaimer, the term of this patent is extended or adjusted under 35 U.S.C. 154(b) by 0 days.

(21) Appl. No.: 09/787,459

(22) PCT Filed: Sep. 16, 1999

(86) PCT No.: PCT/IE99/00095

§ 371 (c)(1),
(2), (4) Date: Mar. 16, 2001

(87) PCT Pub. No.: WO00/17241

PCT Pub. Date: Mar. 30, 2000

(30) Foreign Application Priority Data

Sep. 17, 1998 (IE) .................................................. 980775

(51) Int. Cl.⁷ .................................................. C08F 2/00
(52) U.S. Cl. .................... 526/213; 525/49; 525/309; 526/328; 526/307.5; 526/218.1; 526/219.5; 526/204; 526/301; 526/314; 526/318.42; 526/318.43; 526/320; 526/90
(58) Field of Search .................... 525/49, 309; 526/328, 526/307.5, 218.1, 219.5, 204, 301, 314, 318.42, 318.43, 320, 90, 213

(56) References Cited

U.S. PATENT DOCUMENTS

| 3,682,875 A | | 8/1972 | O'Sullivan et al. .... 260/89.5 R |
| 3,853,967 A | | 12/1974 | Leveskis .................... 260/861 |
| 4,052,355 A | * | 10/1977 | Neukam et al. ............ 524/726 |
| 4,189,365 A | * | 2/1980 | Schmitt et al. ......... 260/998.11 |
| 4,439,380 A | * | 3/1984 | Michl et al. .................... 264/16 |
| 5,003,016 A | | 3/1991 | Boeder |
| 5,683,536 A | | 11/1997 | Kneafsey |
| 6,245,872 B1 | * | 6/2001 | Frey et al. .................... 526/274 |

FOREIGN PATENT DOCUMENTS

| DE | 1 195 491 | 2/1963 | |
| DE | 1 206 584 | 8/1963 | |
| EP | 0 116 658 | 8/1984 | ........... C08G/65/12 |
| EP | 0 502 733 | 3/1992 | ............. C08F/4/00 |
| EP | 0 646 605 | 4/1995 | ........... C08F/10/00 |
| EP | 0 810 251 | 12/1997 | ........... C08G/75/04 |
| GB | 1 293 209 | 10/1972 | ............. C08F/1/74 |
| WO | 95/07304 | 3/1995 | ............. C08F/4/00 |
| WO | 98/14416 | 4/1998 | ............. C07C/7/20 |

OTHER PUBLICATIONS

Von Helmut Bredereck et al., "Die Makromoleculare Chemie", 92 (1966), 70–90.

* cited by examiner

Primary Examiner—Tatyana Zalukaeva
(74) Attorney, Agent, or Firm—Steven C. Bauman

(57) ABSTRACT

An air-activatable polymerisable composition useful, in the field of adhesives, sealants, surface coatings, moulding resins and composite matrices, comprises: a) at least one free-radically polymerisable monomer, b) an activator system for effective polymerisation of the free-radically polymerisable monomer, said activator system comprising at least one auto-oxidisable compound which is a beta diketone, c) a soluble ionic salt, particularly a transition metal salt, d) and a weak acid or a latent weak acid, with the proviso that the composition does not contain a peroxide, or a peroxide precursor which produces peroxide in the absence of air, or any ingredient which is a significant source of radicals in the absence of air.

18 Claims, No Drawings

AUTO-OXIDATION SYSTEMS FOR AIR-ACTIVATABLE POLYMERISABLE COMPOSITIONS

TECHNICAL FIELD

This invention relates to air-activatable polymerisable compositions and their use. The compositions of the invention include air/moisture activatable compositions and dual curing compositions with secondary air-activatable cures. The compositions are suitable for use as one-component systems or in certain cases as two-component systems for forming polymers. The compositions are useful in the field of adhesives, sealants, surface coatings, moulding resins and composite matrices, for example.

BACKGROUND ART

Free radical polymerizable compositions are disclosed in EP-A-O 356 875 of Henkel KGA. These comprise ethylenically unsaturated, polymerizable compounds together with an activator system which can be initiated by oxygen and water, comprising an N-alkyl-substituted tert.arylamine with at least one aliphatic CH bond in the alpha position, a metal compound generally used for accelerating the drying of unsaturated oil and which is at least partially soluble in the composition, and a compound of a weakly acidic carboxylic acid having a pKa value of no less than about 0.9, which can be hydrolyzed to a free carboxylic acid on contact with moisture.

The N-alkyl-substituted tert.-arylamines correspond in particular to the general formula:

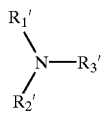

in which $R_{1'}$ is an optionally substituted aryl radical, more especially an optionally alkyl-substituted phenyl radical, $R_{2'}$ has the same meaning as $R_{1'}$ or is an optionally substituted, linear or branched alkyl radical and $R_{3'}$ is a linear or branched alkyl radical which may be substituted, but contains at least one hydrogen atom in the alpha-position to the nitrogen. One particular compound used by way of example is N,N-dimethyl-p-toluidine having the formula:

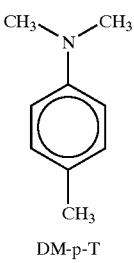

DM-p-T

These compositions depend on the action of both water and oxygen to effect a cure reaction. As such their formulations are very dependant on humidity conditions.

WO 91/10687-A of Henkel KGaA discloses air-activatable adhesive compositions comprising mixtures of free-radically polymerisable unsaturated olefinic compounds, and hydrazone compounds prepared and stored under anaerobic conditions. The hydrazones may be alkyl, cycloalkyl and/or aryl hydrazone(s) of aldehyde(s) and/or ketone(s) and are claimed to react with air to form hydroperoxides useful as polymerisation initiators. The one component compositions are stable in the absence of air.

WO 93/01218 of Henkel KGaA also describes compositions containing hydrazones as activators.

EP-A-0 502 733 (U.S. Pat. Nos. 5,506,326 or 5,610,251) of Loctite (Ireland) Limited (the contents of which are incorporated herein by reference) describes a one-part air-activatable polymerisable composition comprising:
(a) at least one free-radically polymerisable monomer, and
(b) an activator system for effective polymerisation of the free-radically polymerisable monomer, said activator system comprising at least one auto-oxidisable compound of a formula which includes the structure I:

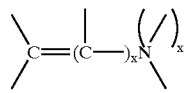

where x is 0 or 1, and where the lines representing unfilled valencies indicate
bonds to carbon, hydrogen or hetero atoms,
alone or in combination with a weak acid;
with the proviso that:
when x=0, the nitrogen atom in structure I is not bonded to a second nitrogen atom;
and when x=1 there is a structure I in the compound in which the >C=C< moiety does not form part of a phenyl ring;
with the proviso that the composition does not contain a peroxide, or a peroxide precursor which produces peroxide in the absence of air or any ingredient which is a significant source of radicals in the absence of air.

Preferred auto-oxidisable compounds are selected from the group consisting of partially hydrogenated pyridines, condensation products of cyclic ketones and ureas, Schiff's bases, indoles, pyrroles, imidazoles, piperazines, carbazoles, tetrahydroquinolines, and substituted derivatives thereof, particularly dihydropyridines.

The presence of a weak acid is generally preferred in order to achieve a satisfactory rate of auto-oxidation for the partially hydrogenated pyridines. The majority of the working examples using dihydropyridines in EP-A-0 502 733 have acrylic acid in the formulation. Other acids used are methacrylic acid, trichloroacetic acid, cyanoacetic acid, salicylic acid, benzoic acid, acetic acid and saccharin.

The composition may also contain a soluble ionic salt, particularly a cobalt or iron salt.

The compositions as described in EP-A-0 502 733 are stable on storage in the absence of air, are activated by exposure to air, and will then cure in either the presence or absence of air.

EP-A-0 611 813 of Loctite (Ireland) Limited describes air-activatable polymerisable compositions containing onium salts and not requiring the presence of a weak acid. WO 90/02142 of Henkel KGaA describes further radical polymerisable compositions having an auto-oxidation activator system comprising an N-alkyl substituted tertiary arylamine, a metal drier compound and a weakly acidic compound.

WO 95/07304 of Henkel KGaA also describes air-activatable compositions containing certain furanones as initiators, especially optionally substituted 2,4,5- triphenylfuran-3-one. Air-activatable compositions must be stable on storage in the absence of air (i.e. under anaerobic conditions). They are activated by exposure to air and then cure in either the presence or absence of air.

It would be desirable to provide additional auto-oxidisable compounds (autoxes) with properties different from those already described.

It would be desirable to provide dual curing compositions with a secondary air-activated cure, the primary cure being either a UV or visible light initiated cure, or another air-activated cure. Dual curing compositions are particularly useful in the electronic field to overcome the problem of "shadow" which can occur with UV or light curing, i.e. part of the electronic component shields the polymerisable composition during exposure to the UV or visible light, so that a secondary cure is required to ensure polymerisation throughout the composition.

Von Helmut Bredereck et al., *Die Makromoleculare Chemie*, 92 (1966), 70–90 describes polymerization initiators which are compounds of the general formula A—CH(R)—B wherein A and B means electron attracting groups, and R is an H atom or an alkyl group. These compounds initiate the polymerization of monomers like methyl methacrylate, acrylonitrile, styrene and vinyl acetate in the presence of $Cu^{++}$, $Cl^-$ and oxygen or peroxides. The =CHR group may be part of a carbocyclic or heterocyclic ring, like cyclic β-oxocarbonic esters, β-oxolactones, β-diketones, pyrazolones or barbituric acids. The start of polymerisation is explained as an auto-oxidation of the active CH-groups to the hydroperoxide, which starts polymerization. However this publication describes the use of copper catalysts only and makes no mention of the use of acids or latent acids.

GB 1,293,209 of Bayer AG describes polyester moulding and coating masses of unsaturated polyesters and copolymerisable ethylenically unsaturated compounds (e.g. acrylic and methacrylic compounds) which contain hydroperoxides as initiators and also contain soluble cobalt compounds as accelerators, and which contain, as additional accelerators, compounds which are derived from cyclopentanone and which are in a keto/enol equilibrium and which correspond to the formulae:

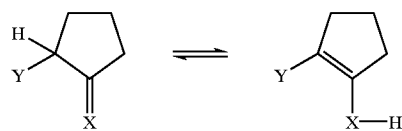

in which X is oxygen and Y is an acyl, carbocyclic acid ester, or N-substituted or unsubstituted carboxamide group.

However there is no teaching that the beta diketones included within the disclosure of the Bayer Patent would be active as autoxes and capable of initiating free radical polymerisation of monomers on contact with air.

It would also be desirable to provide additional autoxes with properties different from those already described.

SUMMARY OF THE INVENTION

More specifically, the present invention provides an air-activatable polymerisable composition comprising:

a) at least one free-radically polymerisable monomer, b) an activator system for effective polymerisation of the free-radically polymerisable monomer, said activator system comprising at least one auto-oxidisable compound which is a beta diketone, c) a soluble ionic salt, particularly a transition metal salt, d) and a weak acid or a latent weak acid, with the proviso that the composition does not contain a peroxide, or a peroxide precursor which produces peroxide in the absence of air, or any ingredient which is a significant source of radicals in the absence of air.

DETAILED DESCRIPTION OF THE INVENTION

This invention provides novel auto-oxidisable compounds for air-activatable compositions.

It was not predictable that the beta diketone compounds would be auto-oxidisable for effective polymerisation of free radically polymerisable monomers on contact with air. The use of the beta diketone compounds in the presence of a weak acid (or an acid released from a latent weak acid) results in improved auto-oxidation reactions as compared to the prior art represented by the paper of Von Helmut Bredereck et al. mentioned above. The compositions of the invention provide the following advantages:

i) the simplicity of the activator system, as the beta diketone compounds are stable in air only but display autox activity in the presence of weak acids and ionic salts (particularly transition metal salts);

ii) there is a large range of beta diketone compounds with a wide range of activities enabling compositions with a broad spectrum of autox activity to be prepared;

iii) numerous beta diketone compounds which are commercially available are clear/colourless solids or liquids with a low tendency towards discolouration and low toxicity;

iv) the activator system has a high tendency to give tack-free cured compositions, thus improving the usefulness of air-activatable compositions for coating applications;

v) the activator system when used as a secondary cure mechanism is compatible with primary UV/visible light initiated primary cures;

vi) the application of external heat sources to compositions of the present invention greatly accelerates the rate of cure, particularly the rate of tack-free cure.

The beta-diketone should have at least one acidic hydrogen atom on its alpha carbon atom. The beta diketone structure is enolisable. The beta-diketone compound should not have any structural or substitutent group which will interfere with the auto-oxidation of the compound and activation of the polymerisation reaction.

The auto-oxidisable beta diketone compounds used in the present invention are suitably those represented by the formula

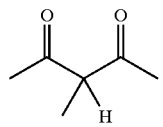

wherein the lines representing unfilled valencies indicate bonds to carbon, hydrogen or hetero atoms.

Hetero atoms may be O, N, S or P.

The beta-diketone compounds may be open-chain compounds of the formula

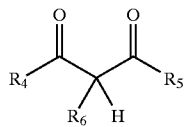

wherein $R_4$ and $R_5$ which may be the same or different are optionally substituted alkyl, optionally substituted alkoxy or $NR_7R_8$ wherein $R_7$ and $R_8$ which may be the same or different are optionally substituted alkyl, and $R_6$ is H, optionally substituted alkyl, or optionally substituted alkoxy.

Desirably one or both of the carbonyl carbon atoms and optionally the alpha carbon atom form part of a ring selected from alicyclic and heterocyclic rings. The cyclic beta-diketone compounds may be of the formulae

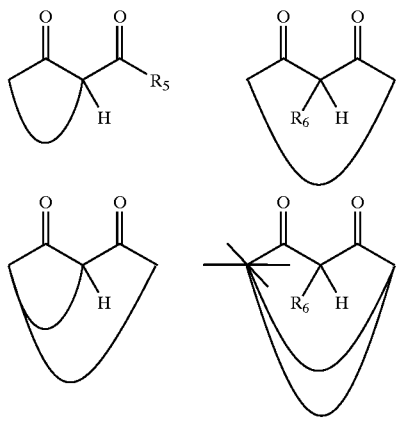

wherein $R_5$ and $R_6$ are as defined above and each of the lines indicating a ring may represent a cycloalkyl or heterocycloalkyl ring which may optionally be substituted. Generally a cycloalkyl or heterocycloalkyl ring may have up to 20 carbon atoms and one or two hetero atoms.

An alkyl or alkoxy group may be straight chain or branched. Suitably an alkyl or alkoxy group may have 1–20, particularly 1–10, especially 1–6 carbon atoms. An alicyclic or heterocyclic ring may suitably be a 5- or 6-membered ring, which may optionally have another alicyclic or heterocyclic ring fused to it with up to 6 members.

The term "substituted" as used herein includes the appropriate group substituted by one or more of oxygen, nitrogen, sulphur or halogen atoms or atom-containing moieties, with the proviso that such groups should not interfere with the polymerisation reactions disclosed in the present application.

A substituted ring may be substituted as in the preceding sentence or may be substituted by optionally substituted alkyl, optionally substituted alkoxy or optionally substituted phenyl.

Halogen may be chlorine, bromine, fluorine or iodine.

Typical examples from within the general formula are represented by the formulae and illustrative compounds below. In the formulae, R is independently selected from alkyl or heteroalkyl and as indicated forms part of a cycloalkyl or heterocycloalkyl ring; $R_4$, $R_5$ and $R_6$ are as defined above; and $R_7$ and $R_8$ which may be the same or different are optionally substituted alkyl. $R_{10}$ is H, optionally substituted alkyl or optionally substituted alkoxy. $R_{11}$ and $R_{12}$ which may be the same or different are H, alkyl or substituted alkyl.

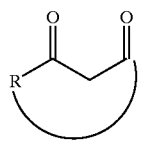

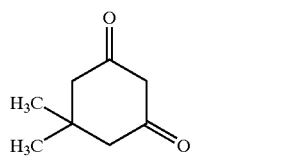

5,5-dimethyl-1,3-cyclohexanedione

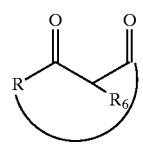

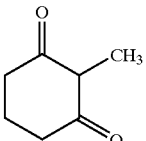

2-methyl-1,3-cyclohexanedione

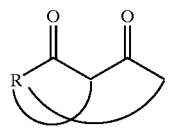
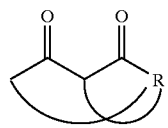

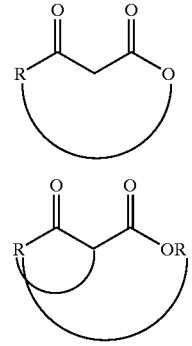
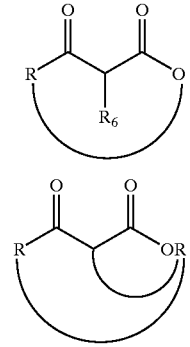

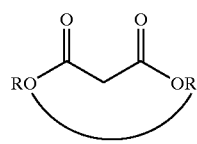
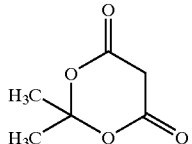

Meldrum's acid

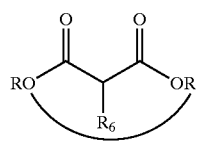
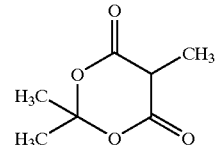

5-methyl Meldrum's acid

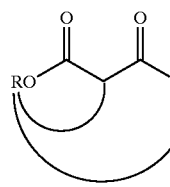
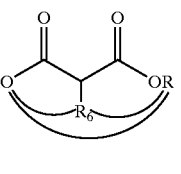

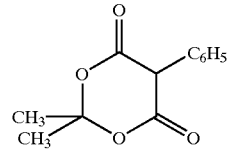

5-phenyl Meldrum's acid

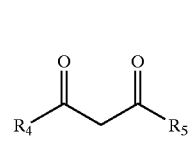

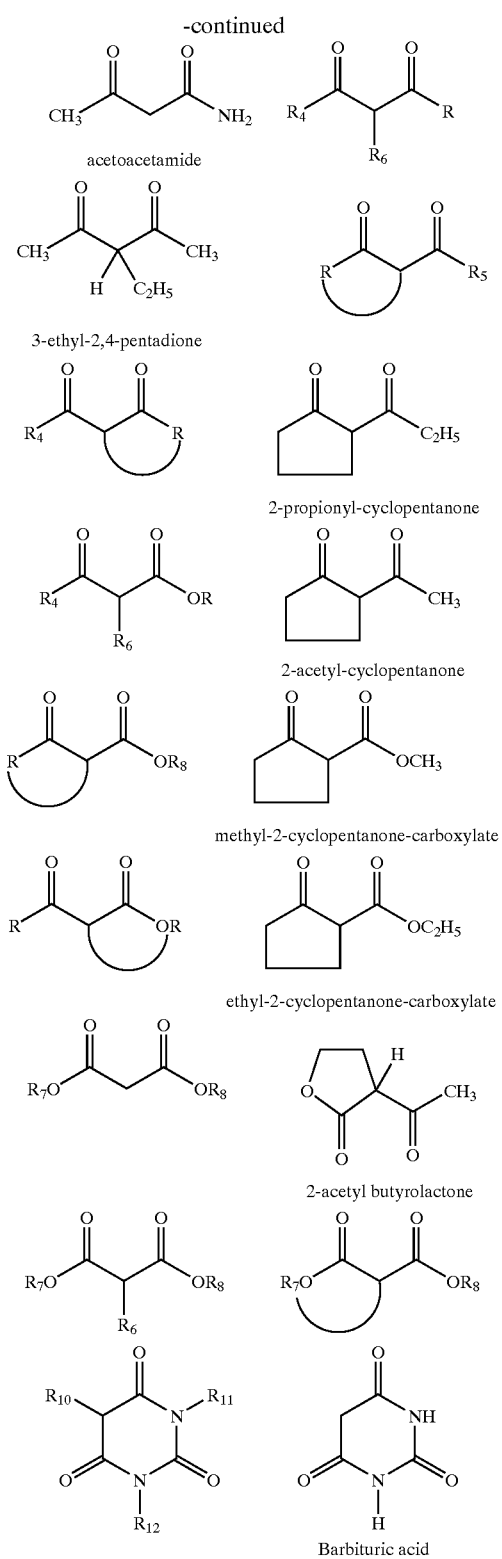

Other beta-diketone compounds as described in the publication by Von Helmut Bredereck et al. cited above, the disclosure of which is expressly incorporated herein by reference, may also be used in the compositions of the invention.

The compositions of the invention may be one-component systems, in which case it is desirable to incorporate a suitable stabiliser in the composition or alternatively the acid (d) may be present as a latent acid, particularly a masked carboxylic acid compound hydrolyzable on contact with moisture, such as an acid anhydride, as described in EP-A-0 356 875 and U.S. Pat. No. 5,268,436, the contents of which are incorporated herein by reference. Alternatively the compositions of the invention may be two-component compositions in which the activator system is kept separate from the monomer until the composition is required to be used.

It has been considered hitherto that the presence of beta-diketone compounds affects the stability of free radical polymerisable compositions. Trace levels of oxygen present in the composition or leaking into it can cause sufficient activation to result in gelling of the composition during storage. This applies even to two-component compositions. It has been found that the stability of compositions containing the beta diketone autoxes can be sufficiently improved by adding a nitroxyl free radical stabiliser as described in our Irish Patent application No. 980774 entitled "IMPROVEMENTS IN AIR-ACTIVATABLE POLYMERISABLE COMPOSITIONS" dated Sep. 17, 1998, the contents of which are incorporated herein by reference. The inclusion of a nitroxyl free radical stabiliser gives an unexpected storage stability with retention of air activatability. The compositions of the present invention are essentially free of peroxide or dissolved oxygen which is one of the principal impurities resulting in the premature polymerisation. The use of a nitroxyl free radical stabiliser is of particular value in combination with a beta diketone autox.

In one aspect therefore the present invention includes an air-activatable polymerisable composition as described above, which additionally comprises: (e) a nitroxyl free radical stabiliser.

This composition may be a one-part composition containing all of the ingredients (a) to (e). A one-part composition stored in the absence of air has an acceptable storage life (say 3–4 months). Alternatively the composition may be a two-part composition, desirably a two part composition in which ingredients (a) and (e) are in the first part and ingredients (b), (c), and (d) are in the second part.

When the two parts of the composition are mixed and held in bulk in a closed container (without exclusion of air), the mixed composition will generally remain stable for a work period, say 24 hours. However the composition when applied as a coating open to air will polymerise and result in a tack-free cure. This is particularly useful in the field of electronics.

In compositions having a beta diketone as auto-oxidisable initiator and containing a nitroxyl free radical stabiliser, an aldehyde may be used as a latent acid instead of having a free acid present in the composition. The aldehyde is auto-oxidisable to yield an acid in situ. This enables the preparation of air-activatable compositions having greater stability than are presently possible and which can cure tack-free within 24 hours in air. The cure system is particularly suited as a secondary cure system in a composition having a primary UV curing system. The aldehyde may suitably be present in an amount of 1–5% by weight of the composition.

According to another aspect of the invention, a composition as described above also includes a primary cure system, e.g. for a UV light cure or a heat cure, while the beta diketone compound is present as an autox for a secondary cure. Such a composition may be either a one-part or a two-part composition.

In all types of the compositions of the invention the presence of the beta diketone autox assists in achieving a tack-free cure, which is of particular benefit in the electronics industry.

Examples of the nitroxyl compounds useful in the composition of the invention (according to one aspect) are described in "*Free Nitroxyl Radicals*" by E. G. Rozantsev, translated by B. J. Hazzard, published by Plenum Press, 1970 and in U.S. Pat. Nos. 3,682,875 and 5,196,589 and the references cited therein, the contents of all which are incorporated herein by reference. U.S. Pat. No. 3,682,875 describes "stable nitroxide free radicals" which are defined as any nitroxide free radical which shows no appreciable decomposition at room temperature or which has a sufficiently low rate of deterioration or decomposition in the composition that its effectiveness as an inhibitor of free radical polymerisation will remain over a reasonable period of time, such as from about three to six months or longer. To achieve utility in this regard, the nitroxide free radical should possess a half life of one month or longer in the composition.

A thorough discussion of nitroxide free radicals, and particularly those which can be prepared in relatively stable form can be found in Forrester A. R. et al., "Organic Chemistry of Stable Free Radicals", Academic Press, London and New York (1968), as well as in, for example, GB 1,127,127 and GB 1,145,470. Basically, as defined in U.S. Pat. No. 3,682,875, the nitroxide free radical is a compound containing the group >N—O. The stability of the free radical is determined primarily by the nature of the two nitrogen substituents.

As a general rule, in the stable nitroxide free radicals used in the compositions herein, each nitrogen substituent is an organic radical containing up to about 20 or more carbon atoms. In the preponderance of stable nitroxide free radicals, each substituent is an alkyl or aryl hydrocarbon group. The above definition is intended to include all substituted alkyl or aryl groups wherein the substituents do not adversely affect the nitroxide free radical for its intended purpose herein.

The preferred stable nitroxide free radicals are those having the following general formula:

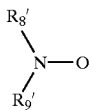

$R_{8'}$ and $R_{9'}$ each being organic radicals wherein the atoms adjacent the nitrogen atom are carbon, and said carbon atoms contain no hydrogen substituents. While some relatively stable nitroxide free radicals have been reported wherein one of the carbon atoms in the alpha position relative to the nitrogen atom did contain a hydrogen atom, it is believed that in nearly all cases the presence of an alpha hydrogen will lead to disproportionation reactions between nitroxide free radical molecules, and hence relatively rapid decomposition. Substituents on the alpha carbon can be, for example, $C_1$–$C_6$ alkyl or alkenyl, halogen, $C_2$–$C_6$ aryl or thioaryl, cyanide, —C(O)NH$_2$, thiophenyl and —C(O)OR$^3$ where R$^3$ is a $C_1$–$C_{12}$ alkyl or aryl.

Common stable nitroxide free radicals include those wherein $R_{8'}$ and $R_{9'}$ together with the nitrogen atom of the nitroxide group, form a heterocyclic ring, e.g.

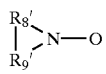

or $R_{8'}$ and $R_{9'}$ are each selected from the group consisting of tertiary alkyl and aryl groups, each of $R_{8'}$ and $R_{9'}$ containing up to about 20 carbon atoms, and most desirably up to about 12 carbon atoms. When both of $R_{8'}$ and $R_{9'}$ are tertiary alkyl, the most highly preferred compound is ditertiary butyl nitroxide. Generally it is preferable, when either or both $R_{8'}$ and $R_{9'}$ are aryl groups, that the para position of each aryl group be substituted since the presence of an accessible hydrogen atom in a para position of the aryl group has been found to be a common source of instability of the nitroxide free radical. When the aryl group is not para-substituted, the instability can be reduced by (a) di-meta substitution or (b) mono- or di-ortho substitution. In all cases, the above substituents can be any substituent which serves to stabilize the nitroxide free radical; however, alkyl, alkoxy and nitro groups have been reported as suitable.

The following are typical examples of stable nitroxide free radicals which can be used in the compositions of the present invention (according to one aspect): di-t-butyl nitroxide; 4,4'-dimethoxydiphenyl nitroxide, 2,2',6,6'-tetramethoxydiphenyl nitroxide; t-butyl-4-nitrophenyl nitroxide; t-butyl-3,5-dimethylphenyl nitroxide; and t-butyl-2,6-dimethoxyphenyl nitroxide.

When $R^8$ and $R^9$ together with the nitrogen atom of the nitroxide group form a heterocyclic ring, it may suitably be a 5- or 6-membered heterocyclic ring which may optionally contain a second hetero atom in addition to the nitrogen atom of the nitroxide group and which may optionally be substituted with substituents which do not interfere with the stabilising effect of the nitroxide free radical.

Suitably the nitroxide free radicals may be of the formula III:

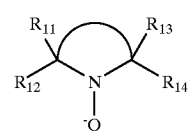

III wherein the line indicating a ring may represent a cycloalkyl or heterocycloalkyl ring which may optionally be substituted, $R_{11}$ and $R_{12}$ which may be the same or different represent any of the optional substituents on the alpha carbon as listed above, and $R_{13}$ and $R_{14}$, which may be the same or different, represent any of the optional substituents on the alpha carbon as listed above, or $R_{13}$ and $R_{14}$ together with the alpha carbon to which they are attached form a bulky organic group.

More particularly the free radicals may be selected from those of the formulae IV or V:

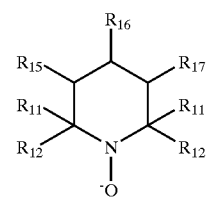

IV

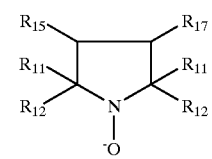

V wherein $R_{11}$ and $R_{12}$ are as defined above; $R_{15}$, $R_{16}$ and $R_{17}$ which may be the same or different, are H, OH, NH$_2$, CN, carboxyl, hydrocarbyl or heterohydrocarbyl groups, which may optionally be substituted; or of the formula VI:

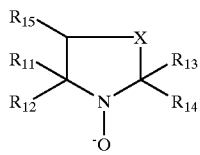

VI wherein X is O or N; $R_{11}$ and $R_{12}$ are as defined above; $R_{13}$ $R_{14}$, and $R_{15}$ are as defined above.

In compounds of formula IV, $R_{15}$ and $R_{17}$ are suitably H and $R_{16}$ is suitably H or one of the other options defined above for $R_{16}$. In compounds of formula V, $R_{15}$ is suitably H and $R_{17}$ is suitably H or one of the other options defined above for $R_{17}$.

$R_{13}$ and $R_{14}$ and the alpha carbon to which they are attached may suitably be $C_6$ to $C_{30}$ alkyl or fatty acid groups, or may form a ring such as a $C_6$ to $C_{10}$ cycloalkyl ring or a steroid structure. When X is N in formula VI, this N atom may be substituted, for example with $C_1$ to $C_6$ alkyl or oxo.

In the definitions of $R_{15}$, $R_{16}$ and $R_{17}$, the terms "hydrocarbyl", "heterohydrocarbyl" and "substituted" are as defined hereinafter. The term "hydrocarbyl" includes (i) straight chain or branched linear or alicyclic aliphatic groups including alkyl, alkenyl and alkynyl, preferably containing from 1 to 20, more preferably from 1 to 10, most preferably from 1 to 5 carbon atoms; and alkylene and alkenylene groups forming part of a ring structure which preferably contains from 3 to 30, more preferably 5 to 20 carbon atoms;

(ii) aromatic groups including aryl, alkaryl and aralkyl groups, preferably containing 6 to 20 atoms, more preferably 6 to 10 carbon atoms, and optionally having a fused ring structure.

The term "heterohydrocarbyl" as used herein includes hydrocarbyl groups as described above interrupted by one or more hetero atoms selected from oxygen, nitrogen or sulphur.

The term "substituted" or "substituted derivative" as used herein includes the appropriate group substituted with one or more oxygen, nitrogen, sulphur or halogen atoms or atom-containing moieties, or with one or more hydrocarbyl, heterohydrocarbyl or silyl groups, which in turn may be substited with one or more oxygen, nitrogen, sulphur or halogen atoms or atom-containing moieties. Halogen may be chlorine, bromine, fluorine or iodine.

One particularly desirable free radical stabiliser is 2,2,6, 6-tetra-methyl-piperidinyloxy (TEMPO) of the formula VII:

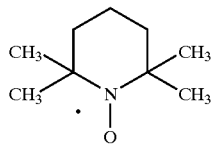

VII and derivatives thereof with substituents $R_{15}$, $R_{16}$ and/or $R_{17}$ as indicated for formula IV, particularly substituents at the 4-position ($R_{16}$) such as 4-amino TEMPO and 4-hydroxy TEMPO.

Other desirable free radical stabilisers include:

2,2,5,5-tetramethyl-pyrolyloxy free radical (PROXYL) of the formula VIII:

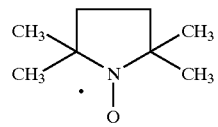

VIII and derivatives thereof substituted with substituents $R_{15}$ and/or $R_{17}$ as indicated above;

and DOXYL derivatives of the formula IX:

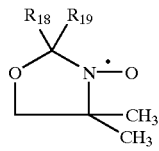

IX wherein $R_{18}$ and $R_{19}$ together with the alpha carbon to which they are attached form a bulky organic group as discussed above for $R_{13}$ and $R_{14}$.

The amount of stable nitroxide free radical used can vary within wide limits, depending upon the specific composition, the specific nitroxide chosen, and the length of time for which the composition is to retain its stability. While as little as 1 part per million by weight, and as much as about one percent by weight can be used a reasonable general range is between about 10 and about 1000 parts per million (ppm) by weight of the composition. Suitably, the range is between about 0.0025% and about 0.05% by weight of the composition, particularly 0.01–0.05%.

Preferred soluble ionic salts (c) are metal salts of the type generally used in oil drying technology. The metals should have several valency states and suitable metal salts are those of multivalent metals, especially transition metals. The metal ions are suitably present in their low valency state. The metal salt must be at least partially soluble in the composition, and may be present in the composition in an effective amount which is generally in a range of between about 1 and about 1,000 parts per million, particularly about 1 to 300 ppm, more particularly about 30 to 200 ppm.

The choice of metal may have a velocity-determining effect on initiation of polymerisation because of a temperature dependence of the metal component in the process. Iron, cobalt, manganese and vanadium are highly active at room temperature. In addition, compounds of these metals can be mixed with one or more other metallic components such as lead, cerium, copper, calcium, barium, zinc and/or zirconium.

Metal naphthenates or metal acetyl acetonates are generally soluble in the composition, but other salts or organometallics may be used if they are sufficiently soluble.

The free-radically polymerisable monomer (a) may be selected from olefinically unsaturated systems such as acrylates, methacrylates, styrene, maleate esters, fumarate esters, unsaturated polyester resins, alkyd resins, thiol-ene compositions, and acrylate, methacrylate, or vinyl terminated resins including silicones and urethanes. Suitable acrylates and methacrylates are those used in polymerisable systems such as disclosed in U.S. Pat. No. 4,963,220 (Bachmann et. al.), and U.S. Pat. No. 4,215,209 (Ray-Chaudhuri et al.). Particularly preferred are hydroxyl-containing methacrylates especially hydroxylalkyl methacrylates such as hydroxypropyl methacrylate. Also preferred are methylmethacrylate, polyfunctional methylacrylates, silicone diacrylates and polyfunctional acrylated urethanes of the type known to be useful in formulating adhesives (e.g. as disclosed in U.S. Pat. No. 4,092,376 of Douek et al.) or a thiol-ene (e.g. as disclosed in U.S. Pat. Nos. 3,661,744; 3,898,349; 4,008,341; or 4,808,638).

The auto-oxidisable compound will generally be present in an effective amount for effecting polymerisation of the composition upon exposure to atmospheric oxygen. Such effective amount is generally within the range of from about 0.1 to about 20%, suitably from about 0.1 to about 10%, more particularly from about 0.5 to about 5%, based on the weight of the polymerisable composition.

The weak acid when present is an acid other than a mineral acid. The pKa of the weak acid normally is no lower than about 0.5, with the preferred limit being about 0.9. The upper limit is approximately 13, more suitably 11.5. However, carboxylic acids which have a pKa of up to about 8, desirably 6 or 7, are particularly suitable.

The carboxylic acids may contain one or more carboxyl groups, suitably 1 to 4 and more desirably 1 or 2 carboxyl groups. Suitable aliphatic carboxylic acids are $C_{1-18}$ and desirably $C_{1-10}$ monocarboxylic acids.

The choice of the acid depends to a large extent on the auto-oxidisable material being used. Suitable acids may be monobasic or polybasic. Typical but not limiting examples of suitable acids are formic acid, acetic acid, propionic acid, maleic acid, malic acid, fumaric acid, acrylic acid and copolymers thereof, methacrylic acid and copolymers thereof, pyruvic acid, itaconic acid, nadic acid, benzoic acid, phthalic acids, cinnamic acid, trichloroacetic acid and saccharin. The effective amount of the acid is generally within the range from about 0.1 to about 20%, suitably from about 0.1 to about 10%, more desirably from about 0.5 to about 5%, based on the weight of the polymerisable composition.

The composition may optionally further comprise reducing agents, thickeners, fillers, pigments and free radical polymerisation stabilisers.

Suitable reducing agents may be, but are not limited to, acetylphenylhydrazine, tetramethylthiourea or thiocaprolactam.

Polymeric thickeners may be present in the compositions in a minor amount, up to about 50%, and may be thickeners such as a polymer or prepolymer of low or high molecular weight. Suitable polymeric thickeners are a commercially available methacrylate polymer sold by E.I. du Pont de Nemours and Company under the trademark Elvacite, or by Rohm and Haas under the Trade Mark Ryloid, as well as styrene-methyl methacrylate co-polymers and polybisphenol A maleate (sold by ICI Americas Inc. under the trademark Atlac). It is also possible to add inert filling materials such as finely divided silica, fumed silica (treated or untreated), montmorillonite, clay, bentonite and the like. The use of micronized silica would result in a paste-like thixotropic composition.

Additionally, it is conventional to include in adhesive formulations certain "inert" fillers such as wood flour, glass fibres, cotton linters, mica, alumina, silica and the like to modify viscosity, improve impact resistance and for other purposes. Such fillers could be incorporated in the formulations of the present invention. Small percentages of silane monomers could also be added to increase moisture resistance, as well as to enhance bonding of an adhesive to glass and similar surfaces. Other substances such as dyes, fire retarders, stabilizers such as quinones and hydroquinones, thixotropes, plasticizers, antioxidants, and the like may also be included, although such additives may often be furnished in the principal ingredients, making their separate introduction unnecessary.

Peroxides, or peroxide percursors which produce peroxide in the absence of air, or any ingredient which is a significant source of radicals in the absence of air, should not be included in the compositions, so that polymerisation of the free-radically polymerisable monomer does not commence until it is exposed to oxygen.

The compositions of the present invention may suitably comprise 0.1 to 20% by weight of the auto-oxidisable compound, 0.1% to 20% by weight of the weak acid or latent weak acid and at least 10% by weight of the free-radically polymerisable monomer, optionally with the ionic salt, thickeners, fillers, pigments, reducing agents and/or stabilisers, the total constituents adding up to 100%.

The invention also provides a method of bonding two substrates comprising coating at least one substrate with a composition as defined above, exposing the composition to oxygen for sufficient time to activate polymerization, and bringing the two substrates together. Typically at least about 5 seconds, but generally at least about 30 seconds exposure to air would be suitable.

Furthermore the invention provides a method of forming a polymer, for example in topical coatings, encapsulation, moulding and the like, comprising exposing to oxygen for sufficient time to activate polymerization a composition as defined above. Typically, at least about 5 seconds, but generally at least about 30 seconds, exposure to air would be suitable.

The above-described compositions are stable when prepared in the absence of air. Exposure to air results in the polymerisation of the composition, the polymerisation being sustained in the presence or absence of air once the initial exposure to air has taken place. Typically the exposure to air should be for at least about 5 seconds, generally not less than 30 seconds, more suitably 1 to 5 minutes.

The composition may be agitated during its exposure to oxygen to accelerate activation by introducing oxygen into the composition. The purpose of agitation is to increase the surface area of the composition exposed to the oxygen. For example the composition may be applied to a substrate in finely divided form, e.g. by spraying or in the form of a foam. The composition may be packaged in and/or dispensed from a container having a nozzle which entrains air as the composition is dispensed, e.g. an aerosol container or pump-action aspirator. In addition, or alternatively, the composition may be agitated on the substrate e.g. by stirring. Agitation of the composition also improves cure-through-volume (CIV) in a layer having significant depth.

The invention further provides a composition as described above packaged in an aerosol container or pump-action aspirator.

The compositions of the invention may be true one-component polymerizable compositions which have good stability when formulated under oxygen-free conditions and stored in a sealed container under inert gas. Alternatively, the compositions of the invention may be two-component compositions. A further advantage of the compositions is that their mechanism of polymerization is independent of the substrate and they thus have a wide range of applications. In addition it is possible to achieve a more uniform distribution of cure in a thick bond line. Additionally, the compositions have rapid fixture times and good bond strengths.

The following examples are provided for illustrative purposes.

EXAMPLES

Example 1

The following composition was prepared in air and polymerised with exotherm to a solid within 5 minutes of preparation.

| | |
|---|---|
| Hydroxypropyl methacrylate (HPMA) | 8.4 g |
| Methacrylic acid | 0.5 g |
| 8% Cobalt Naphthenate in hydrocarbon oil | 0.5 g |
| Methyl-2-cyclopentanone-carboxylate | 0.1 g |

Example 2

The following compositions were prepared in air:

| | Part A | Part B |
|---|---|---|
| Hydroxypropyl methacrylate (HPMA) | 4.0 g | 2.9 g |
| Methacrylic acid | | 2.0 g |
| 6% Cobalt Naphthenate in hydrocarbon oil | | 0.1 g |
| Ethyl-2-cyclopentanone-carboxylate | 1.0 g | |

Formulation A and B remained stable and were tested as follows: samples of the formulation A (one drop) were spread onto stainless steel test bolts (m4) and of the formulation B (one drop) were spread onto mild steel nuts. The nuts were then threaded onto the bolts and allowed to cure at room temperature for 24 hours. The torque strengths were determined according to standard test methods and are presented below:

| Break Strengths Nm | Prevail Strengths Nm |
|---|---|
| 7.6 | 13.6 |

The adhesive compositions were tested as follows:

Samples (one drop) of formulations A and B were placed on onto mild steel test-pieces (100×25 mm–4×1 inches) to form a film of approximately 0.1 mm in depth in air. Then mild steel test-pieces carrying both adhesive formulation A and B were brought together to form an adhesive joint with 12.5 mm (0.5 inch) overlap. The bonds assembled using the above procedure were allowed to cure for 24 hours and were tested according to ASTM-D1002. The results are presented below:

| 3 Kg Fixture times minutes | Shear Strengths MPa |
|---|---|
| 2 | 4.6 |

Example 3

The following compositions were prepared in air:

| | Part A | Part B |
|---|---|---|
| Hydroxypropyl methacrylate(HPMA) | 4.5 g | 3.9 g |
| Methacrylic acid | | 1.0 g |
| 6% Cobalt Naphthenate in hydrocarbon oil | | 0.1 g |
| Ethyl-2-cyclopentanone carboxylate | 0.5 g | |

Formulation A and B remained stable and were tested as follows: samples of the formulation A (one drop) were spread onto stainless steel test bolts (m4) and of the formulation B (one drop) were spread onto mild steel nuts. The nuts were then threaded onto the bolts and allowed to cure at room temperature for 24 hours. The torque strengths were determined according to standard test methods and are presented below:

| Break Strengths Nm | Prevail Strengths Nm |
|---|---|
| 8.4 | 11.4 |

The adhesive compositions were tested as follows:

Samples (one drop) of formulations A and B were placed on onto mild steel test-pieces (100×25 mm–4×1 inches) to form a film of approximately 0.1 mm in depth in air. Then mild steel test-pieces carrying both adhesive formulation A and B were brought together to form an adhesive joint with 12.5 mm (0.5 inch) overlap. The bonds assembled using the above procedure were allowed to cure for 24 hours and were tested according to ASTM-D1002. The results are presented below:

| 3 Kg Fixture times minutes | Shear Strengths MPa |
|---|---|
| 4 | 3.9 |

Example 4

An adhesive formulation B was prepared by formulating in the proportions outlined in the table below, polyethyleneglycol dimethacrylate (PEGMA), 8% Cobalt Naphthenate in hydrocarbon oil, 2,2,6,6 tetramethyl-1-piperidinyloxy free radical (TEMPO), and methacrylic acid. A comparative formulation A was prepared without TEMPO. The formulations were then added to 25 ml aluminium tubes and exposed to a steady stream of inert gas such as nitrogen through a syringe needle for at least two minutes. 2-Acetyl-Butyrolactone was added to the formulations under the inert atmosphere. Each aluminium tube was then sealed by crimping, thus trapping inert gas in the head space above the formulation. Each aluminium tube was shaken for 10–20 seconds to ensure thorough mixing of the formulation components. The composition of the formulations were as follows:

| | Formulation A | Formulation B |
|---|---|---|
| PEGMA | 9.2 g | 9.2 g |
| Methacrylic acid | 0.5 g | 0.5 g |
| 8% Cobalt Naphthenate in hydrocarbon oil | 0.05 g | 0.05 g |
| 2-Acetyl-Butyrolactone | 0.25 g | 0.25 g |
| TEMPO | 0.0 g | 0.001 g |

Formulation A polymerised with an exotherm to a solid inside the aluminium tube within five minutes.

Formulation B remained stable and was tested as follows: samples of the adhesive were squeezed from the aluminium tube and spread onto mild steel test-pieces (m4 bolts) to form a film of approximately 0.1 mm in depth and exposed to air for a measured interval (hereafter referred to as the "open time"). Following the open time the mild steel nuts were threaded onto the bolts and allowed to cure at room temperature for 24 hours. The torque strengths were determined according to standard test methods and are presented in the table below:

| Open Times/ Minutes | Break Strengths Nm | Prevail Strengths Nm |
|---|---|---|
| 2 | 3.6 | 13.4 |
| 5 | 3.2 | 12.4 |
| 10 | 3.6 | 11.4 |
| 20 | 2.8 | 8.0 |

Example 5

The following composition was prepared under anaerobic conditions using the general procedures outlined earlier:

| | |
|---|---|
| Methacrylic acid | 0.5 g |
| 0.1% Cobalt (as 8% Cobalt Naphthenate in hydrocarbon oil) in HPMA | 9.15 g |
| Methyl 2-oxo cyclopentane carboxylate | 0.25 g |
| TEMPO | 0.001 g |

The formulation was tested as an adhesive on grit blasted mild steel test laps (100×25 mm with 12.5 mm overlap) (4×1 inch with 0.5 inch overlap) and allowed to cure for 24 hours giving the following results:

| Open Times/ Minutes | Bond Strengths MPa |
|---|---|
| 2 | 9.1 |
| 10 | 9.9 |

Example 6

The following composition was prepared using the general procedures outlined earlier:

| | |
|---|---|
| PEGMA | 9.3 g |
| Methacrylic acid | 0.3 g |
| 8% Cobalt Naphthenate in hydrocarbon oil | 0.1 g |
| 2-Acetyl-Cyclopentanone | 0.25 g |
| TEMPO | 0.001 g |

The formulation was tested as a threadlocker on mild steel nuts and bolts giving the following results:

| Open Times/ Minutes | Break Strengths Nm | Prevail Strengths Nm |
|---|---|---|
| 2 | 4.8 | 20.4 |
| 5 | 3.8 | 22.6 |
| 10 | 4.4 | 17 |

Example 7

The following composition was prepared using the general procedures outlined earlier:

| | |
|---|---|
| PEGMA | 9.3 g |
| Methacrylic acid | 0.3 g |
| 8% Cobalt Naphthenate in hydrocarbon oil | 0.1 g |
| 3-Ethyl-2,4-Pentanedione | 0.25 g |
| TEMPO | 0.001 g |

The formulation was tested as a threadlocker on mild steel nuts and bolts giving the following results:

| Open Times/ Minutes | Break Strengths Nm | Prevail Strengths Nm |
|---|---|---|
| 2 | 1.8 | 6 |
| 5 | 2.4 | 6 |
| 10 | 2 | 6.2 |

Example 8

The following composition was prepared using the general procedures outlined earlier:

| | |
|---|---|
| PEGMA | 9.3 g |
| Methacrylic acid | 0.3 g |
| 8% Cobalt Naphthenate in hydrocarbon oil | 0.1 g |
| Ethyl,4-methyl-2-cyclohexanone-1-carboxylate | 0.25 g |
| TEMPO | 0.001 g |

The formulation was tested as a threadlocker on mild steel nuts and bolts giving the following results:

| Open Times/ Minutes | Break Strengths Nm | Prevail Strengths Nm |
|---|---|---|
| 2 | 3 | 11.2 |
| 5 | 2.4 | 8.2 |
| 10 | 2 | 6 |

Example 9

The following composition was prepared using the general procedures outlined earlier:

| | |
|---|---|
| PEGMA | 9.3 g |
| Methacrylic acid | 0.3 g |
| 5-Phenyl Meldrums Acid | 0.25 g |
| TEMPO | 0.002 g |

The formulation was tested as a threadlocker on mild steel nuts and bolts giving the following results:

| Open Times/ Minutes | Break Strengths Nm | Prevail Strengths Nm |
|---|---|---|
| 2 | 4.2 | 19.2 |
| 5 | 3 | 10.2 |

Example 10

The following composition was prepared using the general procedures outlined earlier:

| | |
|---|---|
| PEGMA | 8.9 g |
| Methacrylic acid | 0.5 g |
| 8% Cobalt Naphthenate in hydrocarbon oil | 0.25 g |
| Methyl Meldrums Acid | 0.25 g |
| TEMPO | 0.0015 g |

The formulation was tested as a threadlocker on mild steel nuts and bolts giving the following results:

| Open Times/ Minutes | Break Strengths Nm | Prevail Strengths Nm |
|---|---|---|
| 2 | 2.2 | 8.6 |
| 5 | 3 | 9.8 |
| 10 | 2.6 | 12.6 |

Examples 11

The following composition was prepared using the general procedures outlined earlier:

| | |
|---|---|
| PEGMA | 9.3 g |
| Methacrylic acid | 0.3 g |
| 8% Cobalt Naphthenate in hydrocarbon oil | 0.1 g |
| Barbituric Acid | 0.25 g |
| TEMPO | 0.001 g |

The formulation was tested as a threadlocker on mild steel nuts and bolts giving the following results:

| Open Times/ Minutes | Break Strengths Nm | Prevail Strengths Nm |
|---|---|---|
| 2 | 3.6 | 12.8 |
| 5 | 3 | 14 |
| 10 | 4.4 | 12.6 |

An equivalent formulation without the TEMPO polymerised to a solid after preparation:

Example 12

The following composition was prepared using the general procedures outlined earlier:

| | |
|---|---|
| PEGMA | 9.3 g |
| Methacrylic acid | 0.3 g |
| 8% Cobalt Naphthenate in hydrocarbon oil | 0.1 g |
| Ethyl cyclohexanone-2-carboxylate | 0.25 g |
| TEMPO | 0.001 g |

The formulation was tested as a threadlocker on mild steel nuts and bolts giving the following results:

| Open Times/ Minutes | Break Strengths Nm | Prevail Strengths Nm |
|---|---|---|
| 2 | 42. | 15.2 |
| 5 | 2.6 | 8.6 |

Example 13

The following compositions were prepared using the general procedures outlined earlier:

| | 13(a) | 13(b) | 13(c) | 13(d) | 13(e) |
|---|---|---|---|---|---|
| PEGMA | 9.35 g | 9.5 g | 9.5 g | 9.5 g | 9.5 g |
| Methacrylic acid | 0.3 g | 0.3 g | 0.3 g | 0.3 g | 0.3 g |
| 8% Cobalt Naphthenate in hydrocarbon oil | 0.1 g | 0.1 g | 0.1 g | 0.1 g | 0.1 g |
| Methyl 2-oxo-cyclo-pentanone carboxylate | 0.25 g | 0.25 g | 0.25 g | 0.25 g | 0.25 g |
| 4-Amino TEMPO | 0.001 g | — | — | — | — |
| 4-Hydroxy-TEMPO | — | 0.001 g | — | — | — |
| 2,2,6,6 Tetra-methyl piperidine | — | — | 0.001 g | — | — |
| 1,2,2,6,6 Penta-methyl piperidine | — | — | — | 0.001 g | — |
| 2,2,6,6 Tetra-methyl-4-piperidinol | — | — | — | — | 0.001 g |

Both formulations 13(a) and 13(b) remained active (1 g samples dispensed into glass vials in air polymerised with exotherms of the order of 100° C. within 5 minutes) and stable for at least four months. Samples 13(c), (d) and (e) polymerised to solids inside the aluminium tubes within 5 minutes of preparation.

Example 14

The following composition was prepared using the general procedures outlined earlier:

| | |
|---|---|
| PEGMA | 9.5 g |
| Methacrylic acid | 0.3 g |
| 8% Cobalt Naphthenate in hydrocarbon oil | 0.1 g |
| Ethyl-2-oxo-cyclopentane carboxylate | 0.1 g |
| TEMPO | 0.001 g |

The formulation was tested as a threadlocker on mild steel nuts and bolts giving the following results:

| Open Times/ Minutes | Break Strengths Nm | Prevail Strengths Nm |
|---|---|---|
| 2 | 0.4 | 2.2 |
| 5 | 1.8 | 10 |
| 10 | 4.2 | 18 |

Samples of the formulation were accelerated aged at elevated temperatures and remained liquid for at least 50 days at 50° C.

An equivalent formulation without the TEMPO polymerised with an exotherm to a solid inside the aluminium tube within five minutes.

Example 15

The following composition was prepared using the general procedures outlined earlier:

| | |
|---|---|
| PEGMA | 9.5 g |
| Methacrylic acid | 0.3 g |
| 8% Cobalt Naphthenate in hydrocarbon oil | 0.1 g |
| Ethyl-2-cyclohexanone carboxylate | 0.1 g |
| TEMPO | 0.001 g |

The formulation was tested as a threadlocker on mild steel nuts and bolts giving the following results:

| Open Times/ Minutes | Break Strengths Nm | Prevail Strengths Nm |
|---|---|---|
| 2 | 2.8 | 10.2 |

An equivalent formulation without the TEMPO polymerised with an exotherm to a solid inside the aluminium tube within five minutes.

Example 16

The following composition was prepared using the general procedures outlined earlier:

| | |
|---|---|
| 0.1% Co (Acetylacetonate)$_2$ PEGMA | 9.5 g |
| Methacrylic acid | 0.3 g |
| Methyl 2-cyclopentanone carboxylate | 0.25 g |
| TEMPO | 0.001 g |

The formulation was tested as a threadlocker on mild steel nuts and bolts giving the following results:

| Open Times/ Minutes | Break Strengths Nm | Prevail Strengths Nm |
|---|---|---|
| 2 | 1 | 3.4 |
| 5 | 1.8 | 6.6 |
| 10 | 2 | 11 |

An equivalent formulation without the TEMPO polymerised with an exotherm to a solid inside the aluminium tube within five minutes.

Example 17

The composition was prepared using the general procedures outlined earlier:

| | |
|---|---|
| PEGMA | 9.5 g |
| Methacrylic acid | 0.3 g |
| 8% Cobalt Naphthenate in hydrocarbon oil | 0.1 g |
| Methyl-2-oxo-cyclopentane carboxylate | 0.09 g |
| TEMPO | 0.001 g |

The formulation was tested as a threadlocker on mild steel nuts and bolts giving the following results:

| Open Times/ Minutes | Break Strengths Nm | Prevail Strengths Nm |
|---|---|---|
| 5 | 2.6 | 19.4 |
| 10 | 2.6 | 22.4 |
| 20 | 3 | 21.6 |

An equivalent formulation without the TEMPO polymerised with an exotherm to a solid inside the aluminium tube within five minutes.

Example 18

The following composition was prepared using the general procedures outlined earlier:

| | |
|---|---|
| PEGMA | 9.35 g |
| Methacrylic acid | 0.3 g |
| 8% Cobalt Naphthenate in hydrocarbon oil | 0.1 g |
| Methyl-2-oxo-cyclopentane carboxylate | 0.25 g |
| TEMPO | 0.002 g |

The formulation was tested as a threadlocker on mild steel nuts and bolts giving the following results:

| Open Times/ Minutes | Break Strengths Nm | Prevail Strengths Nm |
|---|---|---|
| 2 | 0.2 | 2.4 |
| 5 | 2.2 | 31.4 |
| 10 | 2.6 | 33 |
| 20 | 3 | 28.3 |

This formulation remained stable within the aluminium tube for at least 50 days.

An equivalent formulation without the TEMPO polymerised with an exotherm to a solid inside the aluminium tube within five minutes.

Example 19

The following composition was prepared using the general procedures outlined earlier:

| | |
|---|---|
| PEGMA | 9.3 g |
| Methacrylic acid | 0.3 g |
| 8% Cobalt Naphthenate in hydrocarbon oil | 0.05 g |
| Methyl-2-oxo-cyclopentane carboxylate | 0.25 g |
| TEMPO | 0.001 g |

A 1 g sample of this formulation dispensed into a glass vial in air polymerised with an exotherm (120° C.) after 6 minutes.

The formulation was tested as a threadlocker on mild steel nuts and bolts giving the following results:

| Open Times/ Minutes | Break Strengths Nm | Prevail Strengths Nm |
|---|---|---|
| 2 | 1.6 | 17 |
| 5 | 1.8 | 17 |

Example 20

The following composition was prepared using the general procedures outlined earlier:

| | |
|---|---|
| PEGMA | 9.3 g |
| Methacrylic acid | 0.3 g |
| 8% Cobalt Naphthenate in hydrocarbon oil | 0.01 g |
| Methyl-2-oxo-cyclopentane carboxylate | 0.25 g |
| TEMPO | 0.001 g |

A 1 g sample of this formulation dispensed into a glass vial in air polymerised with an exotherm (124° C.) after 19 minutes.

The formulation was tested as a threadlocker on mild steel nuts and bolts giving the following results:

| Open Times/ Minutes | Break Strengths Nm | Prevail Strengths Nm |
|---|---|---|
| 5 | 1.2 | 3 |
| 20 | 1.8 | 4.4 |

Example 21

The following composition was prepared using the general procedures outlined earlier:

| | 21(a) | 21(b) | 21(c) | 21(d) | 21(e) |
|---|---|---|---|---|---|
| PEGMA | 9.5 g | 9.5 g | 9.5 g | 9.5 g | 9.5 g |
| Methacrylic acid | 0.0 g | 0.1 g | 0.2 g | 0.3 g | 0.5 g |
| 8% Cobalt Naphthenate in hydrocarbon oil | 0.1 g | 0.1 g | 0.1 g | 0.1 g | 0.1 g |
| Methyl-2-oxo-cyclopentane carboxylate | 0.25 g | 0.25 g | 0.25 g | 0.25 g | 0.25 g |
| TEMPO | 0.001 g | 0.001 g | 0.001 g | 0.001 g | 0.001 g |

Formulations 21(a) to (e) were tested as threadlockers on mild steel nuts and bolts giving the following results:

| Open Times/ Minutes | 21(a) | 21(b) | 21(c) | 21(d) | 21(e) |
|---|---|---|---|---|---|
| 2 minutes | | | | | |
| Break Strengths | — | 1.4 | 1.8 | 1.8 | 2 |
| Prevail Strengths | — | 12.8 | 14.8 | 9.4 | 16.4 |
| 5 minutes | | | | | |
| Break Strengths | 1.4 | 1.4 | 1.8 | 2.4 | 2.4 |
| Prevail Strengths | 5 | 13.2 | 11.2 | 12.8 | 22.8 |

Example 22

The following composition was prepared using the general procedures outlined earlier:

| | 22(a) | 22(b) | 22(c) |
|---|---|---|---|
| PEGMA | 9.35 g | 9.35 g | 9.35 g |
| Methacrylic acid | 0.3 g | — | — |
| Acrylic acid | | 0.3 g | |
| Saccharin | | | 0.3 g |
| 8% Cobalt Naphthenate in hydrocarbon oil | 0.1 g | 0.1 g | 0.1 g |
| Methyl-2-oxo-cyclopentane carboxylate | 0.25 g | 0.25 g | 0.25 g |
| TEMPO | 0.001 g | 0.001 g | 0.001 g |

Formulations 22(a) to (c) were tested as threadlockers on mild steel nuts and bolts giving the following results:

| Open Times/ Minutes | 22(a) Nm | 22(b) Nm | 22(c) Nm |
|---|---|---|---|
| 2 minutes | | | |
| Break Strengths | 1.6 | 1.2 | 0 |
| Prevail Strengths | 16 | 20 | 0 |
| 5 minutes | | | |
| Break Strengths | 2 | 1 | 0 |
| Prevail Strengths | 10 | 17.4 | 0 |

Example 23

The following composition was prepared using the general procedures outlined earlier:

| | |
|---|---|
| PEGMA | 9.3 g |
| Methacrylic acid | 0.3 g |
| 8% Cobalt Naphthenate in hydrocarbon oil | 0.1 g |
| 1,3-cyclohexanedione | 0.25 g |
| TEMPO | 0.001 g |

The formulation was tested as a threadlocker on mild steel nuts and bolts giving the following results:

| Open Times/ Minutes | Break Strengths Nm | Prevail Strengths Nm |
|---|---|---|
| 2 | 3.2 | 13.8 |
| 5 | 3.4 | 14 |
| 10 | 3.3 | 12.3 |

An equivalent formulation without the TEMPO polymerised to a solid after preparation.

Example 24

The following composition was prepared using the general procedures outlined earlier:

| | |
|---|---|
| PEGMA | 9.3 g |
| Methacrylic acid | 0.3 g |
| 8% Cobalt Naphthenate in hydrocarbon oil | 0.1 g |
| 5,5-Dimethyl-2-phenacyl-1,3-cyclohexanedione | 0.25 g |
| TEMPO | 0.002 g |

The formulation was tested as a threadlocker on mild steel nuts and bolts giving the following results:

| Open Times/ Minutes | Break Strengths Nm | Prevail Strengths Nm |
|---|---|---|
| 2 | 3.0 | 10.4 |
| 5 | 2.6 | 15.6 |
| 10 | 3.75 | 17.7 |

An equivalent formulation without the TEMPO polymerised to a solid after preparation.

Example 25

The following composition was prepared using the general procedures outlined earlier:

| | 2114-01 |
|---|---|
| PEGMA | 9.4 g |
| Methacrylic acid | 0.3 g |
| Manganous (II) (Acetylacetonate)$_2$ | 0.046 g |
| Methyl-2-oxo-cyclopentane carboxylate | 0.25 g |
| TEMPO | 0.001 g |

The formulation was tested as a threadlocker on mild steel nuts and bolts giving the following results:

| Open Times/ Minutes | Break Strengths Nm | Prevail Strengths Nm |
|---|---|---|
| 2 | 4.2 | 18 |
| 5 | 3.8 | 12.6 |
| 10 | 3.6 | 15.6 |

Example 26

The following composition was prepared using the general procedures outlined earlier:

| | |
|---|---|
| PEGMA | 9.4 g |
| Methacrylic acid | 0.3 g |
| Cobalt (SalAn)* | 0.076 g |
| Methyl-2-oxo-cyclopentane carboxylate | 0.25 g |
| TEMPO | 0.002 g |

*Cobalt SalAn = N,N bis (Salicylidene) dianilino Cobalt(II)

The formulation was tested as a threadlocker on mild steel nuts and bolts giving the following results:

| Open Times/ Minutes | Break Strengths Nm | Prevail Strengths Nm |
|---|---|---|
| 2 | 1 | 5.4 |
| 5 | 0.8 | 4.4 |
| 10 | 2.4 | 7.8 |

Example 27

The composition was prepared using the general procedures outlined earlier:

| | |
|---|---|
| PEGMA | 9.4 g |
| Methacrylic acid | 0.3 g |
| Cobalt(II) Acrylate | 0.037 g |
| Methyl-2-oxo-cyclopentane carboxylate | 0.25 g |
| TEMPO | 0.001 g |

The formulation was tested as a threadlocker on mild steel nuts and bolts giving the following results:

| Open Times/ Minutes | Break Strengths Nm | Prevail Strengths Nm |
|---|---|---|
| 2 | 4.2 | 19.4 |
| 5 | 3.6 | 14.8 |

Example 28

The following composition was prepared using the general procedures outlined earlier:

| | |
|---|---|
| PEGMA | 9.4 g |
| Methacrylic acid | 0.3 g |
| Cobalt(II) Acrylate | 0.0037 g |
| Methyl-2-oxo-cyclopentane carboxylate | 0.25 g |
| TEMPO | 0.001 g |

The formulation was tested as a threadlocker on mild steel nuts and bolts giving the following results:

| Open Times/ Minutes | Break Strengths Nm | Prevail Strengths Nm |
|---|---|---|
| 2 | 3.8 | 11 |
| 5 | 2.4 | 12 |
| 10 | 2.6 | 10.6 |
| 20 | 3.6 | 13 |

Example 29

The following composition was prepared using the general procedures outlined earlier:

| | |
|---|---|
| PEGMA | 9.4 g |
| Methacrylic acid | 0.3 g |
| Cobalt(II) Acetate | 0.043 g |
| Methyl-2-oxo-cyclopentane carboxylate | 0.25 g |
| TEMPO | 0.001 g |

The formulation was tested as a threadlocker on mild steel nuts and bolts giving the following results:

| Open Times/ Minutes | Break Strengths Nm | Prevail Strengths Nm |
|---|---|---|
| 2 | 3.4 | 15.6 |
| 5 | 5 | 22 |
| 10 | 4.6 | 15.6 |

Example 30

The following resin compositions were prepared using the procedures outlined earlier:

| | A | B |
|---|---|---|
| DCPDDMA* | 23% | 22.75% |
| Hydroxyethyl methacrylate (HEMA) | 23% | 22.75% |
| Acrylic Urethane Oligomer** | 45.5% | 45% |
| 8% Cobalt Naphthenate in hydrocarbon oil | 1% | 1% |
| Methacrylic Acid | 5% | 5% |
| Methyl cyclopentanone-2-carboxylate | 2.5% | 2.5% |
| TEMPO | 0.01% | 0.01% |
| UV Photoinitiator (Irgacure 184 Ciba Geigy) | | 1% |

*DCPDDMA = dicyclopentadienyl dimethacrylate
**Novacure 8800 supplied by Interez, Inc.

The following results were obtained with the above compositions when cured under the range of conditions outlined below:

| | A | | B | |
|---|---|---|---|---|
| | Skin Times | Tack-Free Times/mins | Skin Times | Tack-Free Times/mins |
| Room Temp. | 6 hrs | >16 <24 hrs | 1.5 Hrs | 16 to 20 Hrs |
| UV* 6 mW/cm | — | 6 mins | — | 30 secs |
| UV* 100 mW/cm | 40 secs. | 40 secs. | 15 secs | 15 secs |
| 80° C.** | 3 mins | 15 mins | 15 secs | 15 mins |

*UV cured under 6 mW and 100 mW UV light respectively
**Heat cure at 80° C.

Example 31

The following resin compositions were prepared:

| | A | B |
|---|---|---|
| PEGMA | 23% | 22.75% |
| HEMA | 23% | 22.75% |
| Methacrylate resin* | 45.5% | 45% |
| 8% Cobalt Naphthenate in oil | 1% | 1% |
| Methacrylic Acid | 5% | 5% |
| Methyl cyclopentanone-2-carboxylate | 2.5% | 2.5% |
| TEMPO | 0.01% | 0.01% |
| UV Photoinitiator (Irgacure 184 Ciba Geigy) | | 1% |

*Methacrylate Urethane Oligomer, a typical resin used in adhesives preparation

The following results were obtained with the above compositions when cured under the range of conditions outlined below:

|  | A | | B | |
|---|---|---|---|---|
|  | Skin Times | Tack-Free Times/ mins | Skin Times | Tack-Free Times/ mins |
| Room Temp | 24–50 mins <24 | >16 hrs | 16–30 mins | ~16 Hrs |
| UV* 6 mW/cm | — | 7 mins | — | 45 secs |
| UV* 100 mW/cm | 50 secs. | 50 secs. | 20 secs | 20 secs |
| 80° C.** | 3 mins | 15 mins | 3 mins | 13 mins |

*UV cured under 6 mW and 100 mW UV light respectively
**Heat cure at 80° C.

Example 32

An adhesive composition comprising the following components was prepared using the procedures outlined earlier:

| PEGMA | 9.4 g |
|---|---|
| Methacrylic acid | 0.3 g |
| 8% Cobalt Naphthenate in hydrocarbon oil | 0.0037 g |
| Methyl-2-oxo-cyclopentane carboxylate | 0.25 g |
| TEMPO | 0.001 g |

This adhesive composition was tested a threadlocker on a range of substrates giving the following results:

| Open Times minutes | Strengths | Zinc Bichromate Nm | Black Oxide Nm | Zinc Phosphate Nm |
|---|---|---|---|---|
| 2 | Break | 5.8 +/− 2.2 | 2.4 +/− 1.1 | 2.6 +/− 0.5 |
|  | Prevail | 21.2 +/− 4.2 | 16.6 +/− 4.5 | 20.0 +/− 12.3 |
| 5 | Break | 4 +/− 1.1 | 2.2 +/− 1.6 | 2.6 +/− 0.5 |
|  | Prevail | 8.25 +/− 1.5 | 5.2 +/− 3.2 | 21.6 +/− 9.3 |
| 10 | Break | * | * | 2 +/− 0.7 |
|  | Prevail | * | * | 17.6 +/− 7.8 |

*The Zinc Bichromate and Black Oxide nuts and bolts could not be assembled after 10 minute open times.

Example 33

An adhesive composition comprising the following components was prepared using the procedures outlined earlier:

| HEMA + 20% Nippol Rubber | 9.2 g |
|---|---|
| Methacrylic acid | 0.5 g |
| 8% Cobalt Naphthenate in hydrocarbon oil | 0.1 g |
| Methyl-2-oxo-cyclopentane carboxylate | 0.25 g |
| TEMPO | 0.001 g |

This adhesive composition was tested as an adhesive on mild steel laps giving the following results:

| Open Times minutes | 2093-68 Tensile Shear Strengths MPa |
|---|---|
| 2 | 0.0 |
| 5 | 6.9 +/− 1.4 |
| 10 | 5.4 +/− 1.2 |

Example 34

The following compositions were prepared under rigorous anaerobic conditions using the procedures outlined in earlier examples:

|  | A | B | C | D |
|---|---|---|---|---|
| PEGMA | 9.3 g | 9.3 g | 9.3 g | 9.3 g |
| Methacrylic acid | 0.3 g | 0.3 g | 0.3 g | 0.3 g |
| 8% Cobalt Naphthenate in hydrocarbon oil | 0.1 g | 0.1 g | 0.1 g | 0.1 g |
| Methyl-2-oxo-cyclopentane carboxylate | 0.25 g | 0.25 g | 0.25 g | 0.25 g |
| TEMPO | 0.002 g | — | — | — |
| Galvinoxyl | — | 0.005 g | — | — |
| 2,2-Diphenyl picryl hydrazyl | — | — | 0.001 g | — |
| Q1301* | — | — | — | 0.01 g |

*Q1303 is the tradename for the Aluminium salt of N-nitrosophenylhydroxylamine sold by Wako Pure Chemical Industries, Hawthorne, New York.

Formulation A remained stable for at least 50 days at room temperature.

Formulation B polymerised to a solid within 10 minutes of preparation.

Formulation C and D polymerised to solids within 2–3 minutes of preparation.

This example shows that TEMPO was much more effective at stabilising the composition than the other three additives.

Example 35

The following composition was prepared under nitrogen using the general procedures outlined earlier:

| Hydroxypropyl methacrylate | 9.14 g |
|---|---|
| 8% Cobalt naphthenate in hydrocarbon oil | 0.1 g |
| Methyl 2-oxo-cyclopentane carboxylate | 0.25 g |
| Butyraldehyde | 0.5 g |
| TEMPO | 0.001 g |

The auto-oxidisable aldehyde is present as a latent acid. Upon exposure to air the composition cured to a solid within 30 minutes and was tack free within 4 hours.

What is claimed is:

1. An air-activatable polymerisable composition comprising:
   a) at least one free-radically polymerisable monomer,
   b) an activator system for effective polymerisation of the free-radically polymerisable monomer, c) a soluble ionic salt,
d) and a weak acid or a latent weak acid, with the proviso that the composition does not contain a peroxide, or a peroxide precursor which produces peroxide in the absence of air, or any ingredient which is a significant source of radicals in the absence of air,
wherein said activator system comprises at least one auto-oxidizable compound which is a beta diketone.

2. A composition according to claim 1, wherein the soluble ionic salt is a transition metal salt.

3. A composition according to claim 1, wherein the soluble ionic salt is a member selected from the group consisting of iron, cobalt, manganese and vanadium salts.

4. A composition according to claim 1, wherein the auto-oxidisable beta diketone compound comprises the formula:

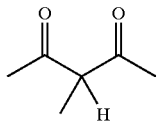

wherein the lines representing unfilled valencies indicate bonds to carbon, hydrogen or hetero atoms.

5. A composition according to claim 1, wherein the beta-diketone compound comprises the formula:

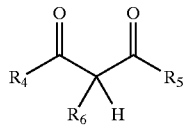

wherein $R_4$ and $R_5$ which may be the same or different are optionally substituted alkyl, optionally substituted alkoxy or $NR_7R_8$ wherein $R_7$ and $R_8$ which may be the same or different are optionally substituted alkyl, and $R_6$ is H, optionally substituted alkyl, or optionally substituted alkoxy.

6. A composition according to claim 4, wherein one or both of the carbonyl carbon atoms, and optionally the alpha carbon atom, form part of a ring selected from alicyclic and heterocyclic rings.

7. A composition according to claim 1, wherein the composition further comprises (e) a nitroxyl free radical stabiliser.

8. A composition according to claim 7, wherein the composition is a two-part composition, in which ingredients (a) and (e) are in the first part and ingredients (b), (c), and (d) are in the second part.

9. A composition according to claim 1, wherein the latent weak acid is an aldehyde.

10. A composition according to claim 9, wherein the aldehyde is present in an amount of 1–5% by weight of the composition.

11. A composition according to claim 1, further comprising a primary cure system, while the beta diketone compound is present as an auto-oxidizable compound for a secondary cure.

12. A composition according to claim 7, wherein the nitroxyl free radical stabiliser is selected from those having the following general formula:

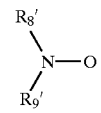

$R_{8'}$ and $R_{9'}$ each being organic radicals wherein the atoms adjacent the nitrogen atom are carbon, and said carbon atoms contain no hydrogen substituents.

13. A composition according to claim 12, wherein $R_{8'}$ and $R_{9'}$ together with the nitrogen atom of the nitroxyl group, form a heterocyclic ring comprising the formula:

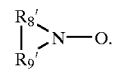

14. A composition according to claim 12, wherein $R_{8'}$ and $R_{9'}$ are each selected from the group consisting of tertiary alkyl and aryl groups, each of $R_{8'}$ and $R_{9'}$ containing up to about 20 carbon atoms, and most desirably up to about 12 carbon atoms.

15. A composition according to claim 7, wherein the nitroxyl free radical stabiliser is ditertiary butyl nitroxide.

16. A composition according to claim 7, wherein the nitroxyl free radical stabiliser is a member selected from the group consisting of 2,2,6,6-tetramethyl-piperidinyloxy; 4-amino-2,2,6,6-tetramethyl-piperidinyloxy; 4-hydroxy-2,2,6,6-tetramethyl-piperidinyloxy; and 2,2,5,5-tetramethyl-pyrrolyloxy.

17. A composition according to claim 7, wherein the nitroxyl free radical stabiliser is present in the range of about 10 to about 1000 parts per million by weight of the composition.

18. A composition according to claim 1, wherein the auto-oxidisable compound is present in an amount of from 0.1 to about 20%, based on the weight of the polymerisable composition.

* * * * *